United States Patent [19]

Lauritzen et al.

[11] Patent Number: 5,345,873
[45] Date of Patent: Sep. 13, 1994

[54] GAS BAG INFLATOR CONTAINING INHIBITED GENERANT

[75] Inventors: Donald R. Lauritzen, Hyrum; Bryan P. Crowell, Hooper, both of Utah

[73] Assignee: Morton International, Inc., Chicago, Ill.

[21] Appl. No.: 934,609

[22] Filed: Aug. 24, 1992

[51] Int. Cl.$^5$ .................................. C06D 5/06
[52] U.S. Cl. ................................. 102/290; 102/289; 149/6
[58] Field of Search ............... 102/289, 290; 149/6

[56] References Cited

U.S. PATENT DOCUMENTS

| | | | |
|---|---|---|---|
| H523 | 9/1988 | Braun | 102/290 |
| 1,074,809 | 10/1913 | Newton | 102/286 |
| 1,308,343 | 7/1919 | DuPont | 102/290 |
| 3,194,851 | 7/1965 | Sauer et al. | 264/3 |
| 3,396,661 | 8/1968 | Michael | 102/103 |
| 3,493,446 | 2/1970 | Braun et al. | 149/109 |
| 3,741,585 | 6/1973 | Hendrickson et al. | 149/35 |
| 3,895,098 | 7/1975 | Pietz | 149/35 |
| 3,901,530 | 8/1975 | Radke | 280/150 AB |
| 3,931,040 | 1/1976 | Breazeale | 149/35 |
| 4,005,876 | 2/1977 | Jorgensen et al. | 280/741 |
| 4,062,708 | 12/1977 | Goetz | 149/35 |
| 4,062,709 | 12/1977 | Castaneda et al. | 149/19.3 |
| 4,131,300 | 12/1978 | Radke et al. | 280/741 |
| 4,200,615 | 4/1980 | Hamilton et al. | 280/741 |
| 4,203,787 | 5/1980 | Kirchoff et al. | 149/35 |
| 4,244,758 | 1/1981 | Garner et al. | 149/35 |
| 4,246,051 | 1/1981 | Garner et al. | 149/7 |
| 4,296,084 | 10/1981 | Adams et al. | 423/351 |
| 4,547,342 | 10/1985 | Adams et al. | 280/741 |
| 4,638,735 | 1/1987 | Lelu et al. | 102/290 |
| 4,696,705 | 9/1987 | Hamilton | 149/35 |
| 4,698,107 | 10/1987 | Goetz et al. | 149/35 |
| 4,806,180 | 2/1989 | Goetz et al. | 149/5 |
| 4,817,828 | 4/1989 | Goetz | 280/736 |
| 4,890,860 | 1/1990 | Schneiter | 280/741 |
| 4,931,112 | 6/1990 | Wardle et al. | 149/88 |
| 4,998,751 | 3/1991 | Paxton et al. | 280/741 |
| 5,000,885 | 3/1991 | Laird et al. | 102/290 |
| 5,015,309 | 5/1991 | Wardle et al. | 149/19.1 |
| 5,034,070 | 7/1991 | Goetz et al. | 149/5 |
| 5,035,757 | 7/1991 | Poole | 149/46 |
| 5,051,143 | 9/1991 | Goetz | 149/5 |
| 5,101,731 | 4/1992 | Adams | 102/290 |

*Primary Examiner*—Peter A. Nelson
*Attorney, Agent, or Firm*—L. Dewayne Rutledge; Gerald K. White

[57] ABSTRACT

An inflator, preferably for an automotive gas bag restraint system, containing a plurality of gas generant bodies which have a relatively inert burn inhibitor coating material thereon. The inhibitor material is preferably a plastic resin. The inhibitor material may also be alumina, titania, silica or a silicate compound, e.g. bentonite. The inhibitors are preferably applied to the generant bodies as a spray. The gas generant may be an azide or a non-azide, preferably an azide and most preferably sodium azide. The inhibited bodies may be any shape, preferably washer-shaped discs in side by side array.

16 Claims, 2 Drawing Sheets

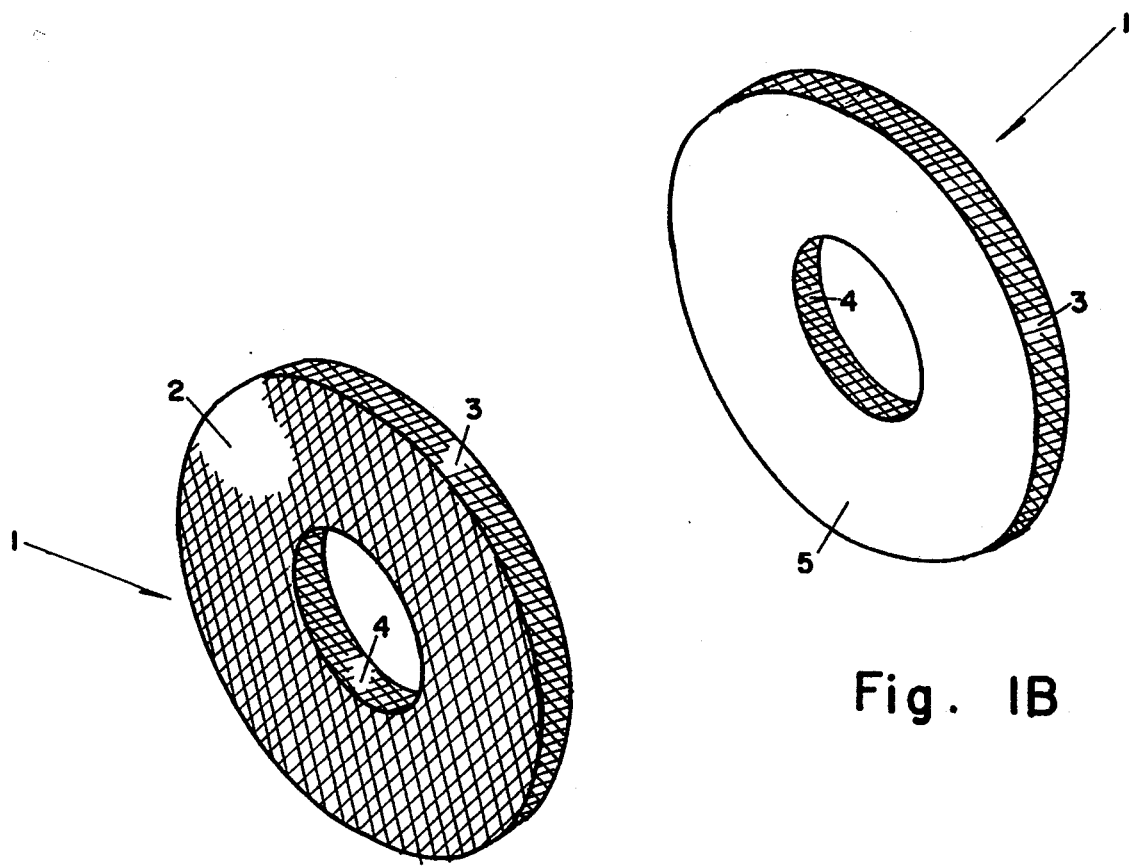
Fig. 1B
Fig. 1A
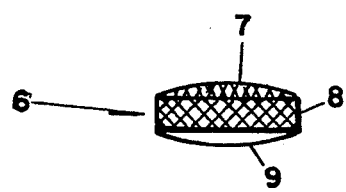
Fig. 2

GAS BAG INFLATOR CONTAINING INHIBITED GENERANT

CROSS REFERENCE TO COPENDING RELATED APPLICATION

This application is related to commonly assigned Ser. No. 07/934,830(MI case #2173-21-00) Aug. 24, 1992, entitled "GAS GENERANT BODY HAVING PRESSED-ON BURN INHIBITOR LAYER", by inventors Bradley W. Smith and Scott C. Mitson.

BACKGROUND OF THE INVENTION

1. Field of the Invention

The present invention pertains to a gas bag inflator or generator containing a plurality of pyrotechnic grains or bodies made of a conventional gas generant or propellant formulation, preferably an azide-based composition, which bodies have a coating of an inert ignition or burn inhibitor or retardant material thereon. The inhibited generant bodies are disposed in the combustion chamber of the gas generator or inflator which produce a gas upon combustion which, after typically filtering out condensed phase products, is preferably used to inflate a gas bag which serves as a vehicle occupant restraint cushion during a collision. More particularly these generant bodies are coated with burn inhibitor materials such as a plastic resin (e.g. acrylic resin), bentonite, etc., preferably applied as a spray.

Even though the generant bodies of this invention are especially designed and suited for creating gas for inflating passive restraint vehicle crash bags as indicated, they would also be useful in other less severe inflation applications, such as aircraft slides, inflatable boats and inflatable lifesaving buoy devices where retarded or slower initial expansion is desirable.

2. Description of the Prior Art

Automobile gas bag systems have been developed to protect the occupant of a vehicle, in the event of a collision, by rapidly inflating a cushion or bag between the vehicle occupant and the interior of the vehicle. The inflated gas bag absorbs the occupant's energy to provide a gradual, controlled deceleration, and provides a cushion to distribute body loads and keep the occupant from impacting the hard surfaces of the vehicle interior.

The use of such protective gas-inflated bags to cushion vehicle occupants in crash situations is now widely known and well documented.

The requirements of a gas generant suitable for use in an automobile gas bag device are very demanding. The gas generant must have a burning rate such that the gas bag is inflated rapidly (within approximately 30 to 100 milliseconds). The burning rate must not vary with long term storage (aging) or as a result of shock and vibration during normal deployment. The burning rate must also be relatively insensitive to changes in humidity and temperature. When pressed into pellets, wafers, cylinders, discs or whatever shape, the hardness and mechanical strength of the bodies must be adequate to withstand the mechanical environment to which they may be exposed over the expected inflator system lifetime of at least ten years without any fragmentation or change of exposed surface area. Excessive breakage of the bodies could potentially lead to system failure where, for example, an undesirable high pressure condition might be created within the gas generator device, possibly resulting in rupture of the pressure housing.

The gas generant must efficiently produce relatively cool, non-toxic, non-corrosive gas which is easily filtered to remove solid and liquid combustion by-products, and thus preclude damage to the inflatable bag or to the occupant of the automobile.

The requirements as discussed in the preceding paragraphs limit the applicability of many otherwise suitable compositions, shapes and configurations thereof from being used in automotive air bag gas generators.

Both azide and non-azide based generant formulations which generate nitrogen-containing or nitrogen-rich gas to expand an inflatable occupant restraint are well known. Exemplary azide-based generants include, for example, at least one alkali or alkaline earth metal azide as the base fuel constituent. See, for example U.S. Pat. Nos. 3,741,585; 3,.895,098; 3,931,040; 4,062,708 and 4,203,787, as well as copending commonly assigned application Ser. No. 07/749,032(MI 2105-21-00) filed Aug. 23, 1991. Exemplary non-azide generants are disclosed in commonly assigned U.S. Pat. Nos. 4,931,112 and 5,015,309 as well as copending application Ser. Nos. 07/744,755(MI 1860-21-00) filed Oct. 9, 1991, and 07/787,500(MI 1859-21-00) filed Nov. 4, 1991, and additional art cited therein. Particulate ingredients of such generant compositions are typically mixed and consolidated, with or without a small amount of a suitable binder and other auxiliary ingredients, by press molding into tablets, wafers, etc., as is conventional. When the gas generant bodies are ignited and burned, nitrogen-containing gas is produced which, after filtering, is used to inflate the gas bag.

It has been proposed in U.S. Pat. Nos. 3,901,530 and 4,131,300 to form the pyrotechnic combustible material for inflators in the form of separate discs arranged side by side with inert separator means disposed between adjacent discs to facilitate quick and uniform combustion of the material as well as achieving slower inflation onset.

Inflators such as shown in commonly assigned U.S. Pat. Nos. 4,005,876; 4,296,084 and 4,547,342 contain gas generant in the form of pressed pellets or tablets (similar in shape to aspirin tablets) which are randomly packed into the inflator combustion chamber. More recently it has been proposed in commonly assigned U.S. Pat. Nos. 4,890,860 and 4,998,751 to fabricate an inflator grain by assembling a plurality of washer-shaped propellant wafers or discs in alternating relationship with a plurality of similarly shaped, meshed inert cushion members which are held in compression in the inflator combustion chamber to achieve improved performance. While such arrangements may be satisfactory for some purposes, the propellant bodies in general present a high initial surface area for burning and thus do not provide as soft of an inflation onset as is desired.

It has also been proposed to provide gas bag inflator wafers or grains with a combustion booster or enhancer coatings. See, for example, U.S. Pat. Nos. 4,200,615; 4,244,758; 4,246,051; 4,696,705; 4,698,107; 4,806,180; 4,817,828; 5,034,070 and 5,051,143. The chief purpose of these booster or enhancer coatings is to speed up, rather than inhibit or slow down, the onset of propellant combustion.

It is also known that inhibitor or restrictor, i.e. slower burning, coatings have been applied to ammunition or firearm type base propellants, as illustrated in U.S. Pat. Nos. 1,074,809; 1,308,343; 3,194,851 and 3,396,661 and solid rocket motor propellant grains, as illustrated in U.S. Pat. Nos. 3,493,446 and 5,000,885.

OBJECTS AND SUMMARY OF THE INVENTION

An object of the present invention is to provide a gas bag inflator containing a generant bodies which have a configuration that can be inhibited to restrict or retard the combustion of a portion of the base generant for a predetermined time period.

Another related object of the present invention is to provide an inflator including generant bodies which will have a dual gas output rate wherein the initial burn is at a low rate of gas output followed by a higher rate of gas output.

Another related object of the present invention is to provide a gas bag inflator having generant bodies so configured that on combustion a delay in bag onset will occur thereby improving the loading on the gas bag components as well as lessening out-of-position occupant concerns during bag deployment, particularly on the passenger side of an automobile.

As set forth in greater detail below, the above objectives of the present invention have been achieved by configuring each generant body making up the inflator grain to have a relatively inert, burn inhibitor or deterrent coating thereon of, for example, an acrylic resin, bentonite (or other hydrous silicate clays) or mixtures thereof, preferably applied as a spray.

Though the inert inhibitor coating according to the invention may completely cover one or both faces or sides of a generant body (inhibitor covering one wafer face being most preferred), it may also cover less than the entire expanse or face of the generant body, e.g. a continuous annular layer on the outer, intermediate or inner periphery of a disc-shaped wafer.

The generant body on which the inert inhibitor is applied may be made of any conventional azide or non-azide based generant formulation, most preferably sodium azide.

The inhibited generant body may take any of the aforementioned conventional pellet, tablet, wafer, etc. forms, most preferably a washer-shaped disc.

Another important feature relates to an inflator including stack or side by side assembly of a plurality of the inhibited generant bodies according to the present invention.

Another important feature pertains to a method of inflating a gas bag by generating nitrogen-containing or nitrogen-rich gas by igniting the composite inhibited generant bodies according to the present invention and using the gas generated to inflate the gas bag.

The above and other objectives, advantages and features of this invention will be apparent in the following detailed descriptions of the preferred embodiments thereof which is to be read in conjunction with the accompanying drawings.

BRIEF DESCRIPTION OF THE DRAWINGS

FIG. 1A is a space view of a washer-shaped generant wafer disc having a burn inhibitor coating on one face as well as the inner and outer peripheral walls.

FIG. 1B is a space view of the flip-side of the FIG. 1A wafer showing the uninhibited other face.

FIG. 2 is a space view of a pellet or tablet shaped generant body having a burn inhibitor coating on one face and peripheral wall.

DETAILED DESCRIPTION OF THE INVENTION

Figure 3:
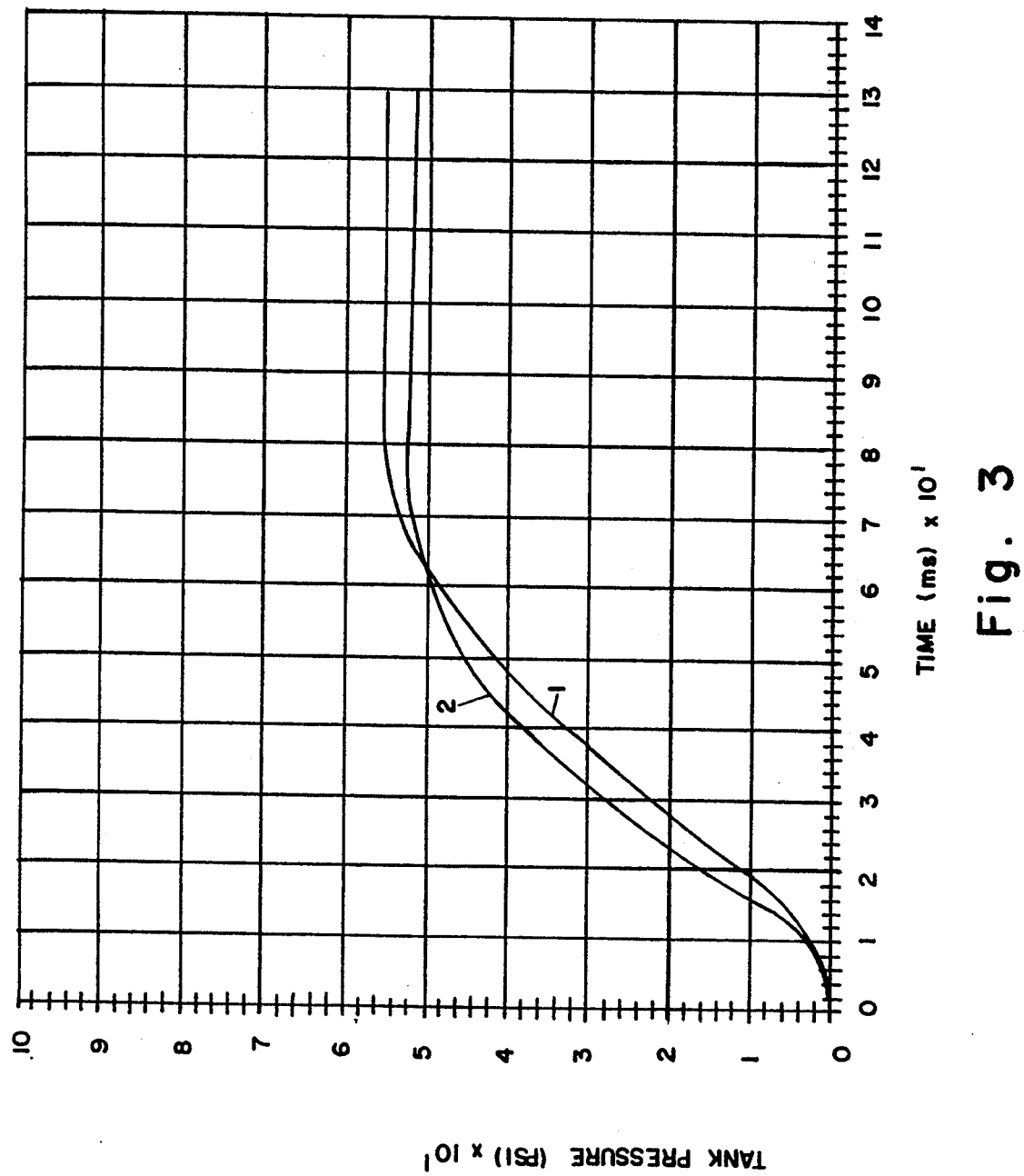
FIG. 3 is an S-curve graph showing the inflator burn traces of inhibited generant bodies as compared with uninhibited generant bodies.

In some inflatable gas bag restraint applications, it is desirable to have an inflation system and procedure which demonstrates a dual gas output rate effect; that is, one which starts with a low rate of gas output during the first about 5 to 25 milliseconds, followed by a higher rate of gas output for the remainder of the inflation cycle whereby the loading on the gas bag system components are reduced as well as lessening the potential for harmful effects on an occupant (e.g. a small child) that is "out of position" (i.e. not properly positioned in the path of a deploying gas bag).

FIGS. 1A, 1B and 2 show two exemplary embodiments according to the invention of coated bodies 1 and 6, respectively, each having a main gas generant or propellant body part having a relatively inert burn inhibitor or restrictor layers 2, 3, and 4, and 7 and 8, respectively, thereon whereby the above objectives are realized. FIG. 1A shows a washer-shaped generant disc 1 having an inhibitor coating on one face or side 2 and on the outer and inner peripheral walls 3 and 4, respectively, of the disc. FIG. 1B shows the flip-side of the FIG. 1A disc showing the uncoated and uninhibited other face or side 5 as well as inhibited peripheral walls 3 and 4. FIG. 2 shows a generant pellet or tablet 6 having an inhibitor coating on one face or side 7 and peripheral wall 8; whereas face or side 9 is uncoated and uninhibited.

The composition of the generant part of the coated bodies 1 and 6 is not critical; thus any known gas generant composition, for example, any azide or non-azide based fuel formulation can be used, especially those used for automotive gas bag inflators meeting such well known requirements as burning rate, non-toxicity and flame temperature. The generant is preferably an azide-based fuel which produces nitrogen-containing or nitrogen-rich gas, more preferably an alkali metal azide, and most preferably sodium azide. Exemplary azide-based generant compositions are disclosed in aforementioned U.S. patents, preferably formulations containing sodium azide, iron oxide, molybdenum disulfide and optionally sulfur according to aforementioned U.S. Pat. No. 4,203,787; compositions containing sodium azide, iron oxide, sodium nitrate, silica, alumina and optionally bentonite according to aforementioned copending application Serial No. 07/749,032 filed Aug. 23, 1991; or most preferably formulations containing sodium azide, molybdenum disulfide and sulfur according to aforementioned U.S. Pat. No. 3,741,585. Exemplary non-azide based formulations are disclosed in aforementioned U.S. Pat. Nos. 4,931,112 and 5,015,309 as well as aforementioned application Serial Nos. 07/744,755 and 07/787,500 and additional art cited therein.

The burn inhibitor or retardant material coated on the generant wafers tested and represented by curve 1 in the FIG. 3 graph was KRYLON ® acrylic resin; and though this resin is the preferred inhibitor, other organic plastic resins may be utilized instead, as well as various inorganic base materials, such as alumina, titania, silica and silicate compounds, and mixtures thereof. The silica and silicate compounds (both hydrous and anhydrous) may be natural, refined or synthetically derived. The preferred inorganic inhibitor is naturally occurring complex silicate compounds, most preferably bentonite (a hydrous silicate clay). To render the bentonite (as well as the other mentioned inorganic inhibitors) readily coatable, powders of these materials may, for example, be combined with suitable reducers and/or binders, as is well known in the art. The inhibitor coating may be applied by any of such well known painting techniques as spraying, rolling, brushing, buttering, etc. However, spray coating is preferred since it is better suited for continuous, automated application. Multiple coatings may be applied to achieve any desired inhibitor thickness.

The crux of the present invention centers on the relatively inert nature and composition of the burn inhibitor, as above described, together with the characteristics and properties imparted to the generant due to the configuration and manner in which the inhibitor coating(s) is applied or combined with the baseline generant body. During the combustion process the inhibiting coating burns and/or attrites away progressively exposing the additional surface of baseline generant. This newly exposed generant burning surface proportionally increases the rate of gas output creating the desired dual rate effect. The timing of the rate change is a function of the rate of loss or erosion of the inhibitor. Varying the thickness of the baseline generant may be used to obtain a steeper or shallower pressure slope angle and a shorter or longer burnout time.

The dual rate effect is graphically illustrated by the exemplary curves of FIG. 3 wherein Tank Pressures (psi $\times 10^1$) vs. Time (milliseconds $\times 10^1$) data is plotted for two sets of test samples carried out in a 100 liter closed tank comparing inflators with and without inhibited wafers. S-curve 1 represents a series of data points for a mass of burn inhibited generant wafers (similar to the wafers of FIG. 1A and 1B) in accordance with the invention. S-curve 2 represents a series of data points for a mass of uninhibited control or standard generant wafers. The inhibited wafers tested were comprised of approximately 6.5 g of generant and 0.1g of KRYLON® burn inhibitor. The composition of both type generant wafers comprised (all percents by weight) about 68% $NAN_3$, about 30% $MoS_2$ and about 2%S. As can be seen from comparing curves 1 and 2 the KRYLON® resin coating significantly reduces or suppresses the burn of the generant, for example, at 20 ms the burn would be suppressed by approximately 30%.

The inhibited generant bodies according to the invention preferably have a wafer shape, more preferably a cylinder or disc, and most preferably a washer-shaped disc as shown in Figs. 1A and 1B. To particularly illustrate, the outside diameter of disc 1 as shown in FIGS. 1A and 1B may vary from about 1.375 to about 1.500 inches, the inside diameter (i.e. diameter of opening) may vary from about 0.400 to about 0.562 inches, the thickness of the generant body may vary from about 0.100 to about 0.280 inches, and the thickness of the inhibitor layers 2–4 may vary from about 0.010 to about 0.025 inches. A somewhat less preferred body form is a pellet or tablet (similar in shape to an aspirin tablet) as depicted in FIG. 2. To particularly illustrate, the outside diameter of pellet or tablet 6 as shown in FIG. 2 may vary from about 0.250 to about 0.375 inches, the thickness of the generant body may vary from about 0.070 to about 0.280 inches and the thickness of the inhibitor layers 7 and 8 may vary from about 0.010 to about 0.025 inches. However, the overall shape of the generant body is not critical and can be virtually any shape, such as elliptical, rectangular (preferably a square) or the like. Although central holes or openings as shown in FIGS. 1A and 1B are preferred in the wafer disc design such openings may be omitted for certain applications, e.g. a solid multi-wafer grain as is known in the art. The shape of the opening in the wafer is not critical and may take a variety of shapes, such as elliptical, triangular, rectangular, etc., even though circular openings as shown in FIGS. 1A and 1B are preferred. The shape of the opening is typically governed by the shape of the igniter chamber (which is normally circular) on which the wafers are preferably arranged. Also the perimeter wall 3 of the generant body 1, as well as the inner wall 4 defining the opening as shown in FIGS. 1A and 1B, may have a saw-tooth or serrated design so as to increase the generant surface area presented for combustion, facilitate grain assembly, etc.

Although, as previously indicated, the potential utility of such generant bodies may be quite varied, according to the invention the preferred application is to form the generant mass in conventional inflators or gas generators therefrom, most preferably that utilized in the combustion chamber of a conventional automotive gas bag crash protection restraint system. Although a plurality of the composite generant bodies of the invention (e.g. the pellet or tablet 6 of FIG. 2) may be randomly packed into an inflator combustion chamber (e.g. as shown in aforementioned U.S. Pat. Nos. 4,005,876 and 4,547,342), the preferred configuration and arrangement comprises a plurality of side by side (or stack of) composite wafer-shaped bodies (e.g. the washer-shaped disc 1 of FIGS. 1A and 1B) having alternating inert spacer screens or discs forming a propellant grain or array (e.g. as illustrated in aforementioned U.S. Pat. Nos. 4,890,860 and 4,998,751). These documents also show the well known basic component parts of such exemplary gas bag inflators; namely, a combustion chamber with a gas outlet, a generant mass or grain disposed within the combustion chamber, an igniter for the generant and gas passage means for routing gas generated to the gas outlet from the chamber, which gas is typically filtered to remove condensed phase combustion products. When the generant in these systems is ignited and burned, nitrogen-containing gas is produced which is used to inflate the gas bag.

Though it is preferred that the generant bodies be coated with burn inhibitor as depicted in the Figures, either more or less area of the bodies may be coated. For example, parts of both faces or side may be coated, peripheral walls 3, 4 and may be left uncoated (e.g. by masking), or an annular band or strip of inhibitor may be applied on either the outer, inner or intermediate the periphery of a wafer disc such as shown in FIGS. 1A and 1B.

In addition, the inhibitor coating on one or both sides of the generant may be suitably built up to consist of a series of equally spaced, raised projections or pads which, for example, may have the configuration as disclosed in commonly assigned copending application Ser. No. 07/848,903 (MI 2146-21-00) filed Mar. 10, 1992.

If necessary, conventional binders (such as polypropylene carbonate, molybdenum disulfide and the like) and other auxiliary agents may be added in small amounts (typically about 1–6 wt.%) to the particulate generant formulation prior to consolidation.

With this description of the invention in detail, those skilled in the art will appreciate that various modifications may be made to the invention without departing from the spirit thereof. Therefore it is not intended that the scope of the invention be limited to the specific embodiments illustrated and described. Rather it is intended that the invention scope be determined by the appended claims and their equivalents.

We Claim,

1. A gas bag inflator comprising:
a combustion chamber having a gas outlet;
a plurality of gas generant bodies disposed within said chamber, each of said generant bodies being coated with a relatively inert burn inhibitor material which substantially covers only one face and the peripheral walls thereof;
means for igniting the inhibited bodies; and
means for routing gas generated from said chamber through the gas outlet.

2. A gas bag inflator according to claim 1 wherein the inhibitor material comprises a plastic resin.

3. A gas bag inflator according to claim 1 wherein the inhibitor coating is applied to the generant bodies as a spray.

4. A gas bag inflator according to claim 1 wherein each of the inhibited bodies are wafer-shaped and arranged in side by side relationship.

5. A gas bag inflator according to claim 4 wherein the inhibited wafers are individually separated by spacer means.

6. A gas bag inflator according to claim 4 wherein the wafers are washer-shaped and the inhibitor coating substantially covers the face of each wafer and the inner and outer peripheral walls.

7. A gas bag inflator according to claim 1 wherein the gas generant body comprises an azide-based composition.

8. A gas bag inflator according to claim 7 wherein the azide is sodium azide.

9. A gas bag inflator according to claim 1 including a gas bag deployment means connected to the gas outlet.

10. A method of inflating a gas bag comprising igniting a plurality of gas generant bodies disposed within a combustion chamber, each body having a relatively inert burn inhibitor material coating which substantially covers only one face and the peripheral walls thereof, and using the gas generated to inflate the gas bag.

11. A method of inflating a gas bag according to claim 10 wherein the inhibitor material comprises a plastic resin.

12. A method of inflating a gas bag according to claim 10 wherein the inhibitor coating is applied to each generant body as a spray.

13. A method of inflating a gas bag according to claim 10 wherein the inhibited body is wafer-shaped.

14. A method of inflating a gas bag according to claim 10 wherein each gas generant body comprises an azide-based composition.

15. A method of inflating a gas bag according to claim 14 wherein the azide is sodium azide.

16. A method of inflating a gas bag according to claim 13 wherein the generant wafers are washer-shaped and the inhibitor coating substantially covers the face of each wafer and the inner and outer peripheral walls.

* * * * *

UNITED STATES PATENT AND TRADEMARK OFFICE
CERTIFICATE OF CORRECTION

PATENT NO. : 5,345,873
DATED : September 13, 1994
INVENTOR(S) : Lauritzen et al.

It is certified that error appears in the above-indentified patent and that said Letters Patent is hereby corrected as shown below:

Column 1, line 8;    insert --filed-- before "Aug. 24, 1992,"

Column 5, line 40;   change "NAN$_3$" to --NaN$_3$--

Column 6, line 47;   insert --8-- after "and"

Signed and Sealed this

Eighth Day of November, 1994

Attest:

BRUCE LEHMAN

Attesting Officer

Commissioner of Patents and Trademarks